United States Patent
Wu et al.

(10) Patent No.: US 9,362,745 B2
(45) Date of Patent: Jun. 7, 2016

(54) POWER STORAGE MODULE AND POWER STORAGE DEVICE

(71) Applicant: Delta Electronics (Shanghai) Co., Ltd., Shanghai (CN)

(72) Inventors: Hong-Yang Wu, Shanghai (CN); Xiao Li, Shanghai (CN); Wen-Tao Zhan, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 97 days.

(21) Appl. No.: 14/285,650

(22) Filed: May 23, 2014

(65) Prior Publication Data
US 2015/0069844 A1    Mar. 12, 2015

(30) Foreign Application Priority Data
Sep. 10, 2013    (CN) .......................... 2013 1 0409995

(51) Int. Cl.
*H02J 1/00* (2006.01)
*H02J 1/10* (2006.01)
*H02J 3/32* (2006.01)
(Continued)

(52) U.S. Cl.
CPC . *H02J 1/102* (2013.01); *H02J 3/32* (2013.01); *H02J 7/345* (2013.01); *H02J 1/12* (2013.01); *Y10T 307/658* (2015.04); *Y10T 307/669* (2015.04); *Y10T 307/707* (2015.04)

(58) Field of Classification Search
CPC ............ H02J 1/102; H02M 3/04; H02M 7/44
USPC .......................................................... 307/74
See application file for complete search history.

(56) References Cited

U.S. PATENT DOCUMENTS

| 4,328,429 A * | 5/1982 | Kublick ..................... H02J 3/38 |
| | | 307/58 |
| 6,750,391 B2 * | 6/2004 | Bower ..................... H02S 20/23 |
| | | 136/244 |

(Continued)

FOREIGN PATENT DOCUMENTS

| CN | 1966975 A | 5/2007 |
| CN | 101789620 A | 7/2010 |

(Continued)

OTHER PUBLICATIONS

H.S. Hong, "Research on Capacity Configuration and Coordinated Control of Hybrid Energy Storage System for Smoothing Out Wind Power Fluctuations," in China Master's Theses Full-text Database, published on Jul. 15, 2013.

*Primary Examiner* — Jared Fureman
*Assistant Examiner* — Alfonso Perez Borroto
(74) *Attorney, Agent, or Firm* — CKC & Partners Co., Ltd.

(57) ABSTRACT

A power storage module and a power storage device are disclosed. The power storage module and the power storage device include a DC/AC converter, a first power storage element, a second power storage element and at least one DC/DC converter. The first power storage element is coupled to the DC side of the DC/AC converter to form a first power storage branch. The second power storage element is coupled to the DC side of the DC/AC converter to form a second power storage branch. The DC/DC converter is disposed on the first power storage branch or the second power storage branch.

24 Claims, 11 Drawing Sheets

(51) Int. Cl.
  *H02J 7/34* (2006.01)
  *H02J 1/12* (2006.01)

(56) References Cited

U.S. PATENT DOCUMENTS

| | | | | |
|---|---|---|---|---|
| 2004/0125618 A1* | 7/2004 | De Rooij | | H02J 1/102 363/17 |
| 2007/0138792 A1* | 6/2007 | Liu | | H02J 4/00 290/1 A |
| 2009/0179500 A1* | 7/2009 | Ragonese | | H02J 1/10 307/82 |
| 2009/0279336 A1* | 11/2009 | Erdman | | H02M 7/53875 363/131 |
| 2010/0133911 A1* | 6/2010 | Williams | | G05F 1/67 307/82 |
| 2011/0019444 A1* | 1/2011 | Dargatz | | H02H 1/0015 363/50 |
| 2011/0115301 A1 | 5/2011 | Bhavaraju et al. | | |
| 2011/0260690 A1* | 10/2011 | Kojori | | H02J 3/32 320/134 |
| 2012/0033466 A1* | 2/2012 | Moussaoui | | H02J 3/385 363/65 |

FOREIGN PATENT DOCUMENTS

| | | |
|---|---|---|
| CN | 102069721 A | 5/2011 |
| CN | 102237691 A | 11/2011 |
| CN | 102983589 A | 3/2013 |
| CN | 103219899 A | 7/2013 |
| CN | 103259287 A | 8/2013 |
| WO | 2007/037972 A2 | 4/2007 |

* cited by examiner

POWER STORAGE MODULE AND POWER STORAGE DEVICE

RELATED APPLICATIONS

This application claims priority to China Application Serial Number 201310409995.2, filed Sep. 10, 2013, which is herein incorporated by reference.

BACKGROUND

1. Field of Invention

The present invention relates to a power storage module. More particularly, the present invention relates to a power storage module and a power storage device with a power management function.

2. Description of Related Art

With advances in science and technology, there has been an increase in the demand for high power quality. In order to provide an AC sinusoidal wave with a stable voltage, a stable frequency, no electrical surge, no peak disturbance, and no harmonic wave, a power storage device is utilized to suppress mains voltage fluctuations, frequency shifting, harmonic waves, and unbalanced three-phase voltage. The power storage device also provides emergency protection measures when electricity supply failure is encountered or electrical surge occurs unexpectedly. Moreover, with respect to renewable energy, because most power generated by a renewable energy generating apparatus may change a periodically and unexpectedly, when, for example, solar power, wind power, or tidal power is inputted directly into a power grid, this may seriously affect the operation stability of the power grid, thereby limiting the development and utilization of renewable energy. By setting up a power storage device between the renewable energy generating apparatus and the power grid, the power may be buffered and regulated such that the utilization of renewable energy may be increased.

According to power storage technology, traditional power storage devices with a large capacity may be classified into five types. Reference is made to FIG. 1a. FIG. 1a illustrates a conventional single-stage isolation power storage device 100a. The power storage device 100a includes plural power storage modules 110a, and each of the power storage modules 110a includes a storage cell 111 and a DC/AC converter 112. The storage cell 111 is coupled to the DC side of the DC/AC converter 112. In addition, the AC side of each of the DC/AC converters 112 is coupled to one side of a transformer 120 in parallel to isolate the power storage modules 110a. The other side of the transformer 120 is coupled to an AC bus 130. The power storage device 100a collects the power to the AC bus 130 through the transformer 120. The power storage device 100a connects an AC load 140 independently by the AC bus 130 or connects an AC power grid 150 inline by a switch S.

FIG. 1b illustrates a conventional single-stage non-isolation power storage device 100b. Similar to the power storage device 100a, each of a plurality of power storage modules 110b of the power storage device 100b includes a storage cell 111 and a DC/AC converter 112. Each of the power storage modules 110b is coupled to an AC bus 130 in parallel directly. Reference is made to FIG. 1c. FIG. 1c illustrates a conventional double-stage isolation power storage device 100c. Each of a plurality of power storage modules 110c of the power storage device 100c includes a storage cell 111, a DC/AC converter 112 and a DC/DC converter 113. The storage cell 111 is connected to the DC side of the DC/AC converter 112 through the DC/DC converter 113. Similarly, the AC side of each of the DC/AC converters 112 is coupled to one side of a transformer 120 in parallel. The other side of the transformer 120 is coupled to an AC bus 130. The power storage device 100c collects the power to the AC bus 130 through the voltage transformer 120. The power storage device 100a connects an AC load 140 independently by the AC bus 130 or connects an AC power grid 150 inline by a switch S.

Furthermore, FIG. 1d illustrates a conventional double-stage non-isolation power storage device 100d. Similar to the power storage device 100c, in each of a plurality of power storage modules 110d of the power storage device 100d, a storage cell 111 is connected to the DC side of a DC/AC converter 112 through a DC/DC converter 113. Each of the power storage modules 110d is coupled to an AC bus 130 in parallel directly.

Moreover, there is a power storage technology with a more complicated control method. Reference is made to FIG. 1e. FIG. 1e illustrates a conventional double-stage serial power storage device 100e. As shown in FIG. 1e, in the power storage device 100e, each output of a plurality of DC/DC converters 113 is connected to each other in series. Each DC side of a plurality of DC/AC converters 112 is connected to each other in parallel. Each of a plurality of storage cells 111 collects the power to an AC bus 130 through the serially connected DC/DC converters 113 and the parallel-connected DC/AC converters 112, connects an AC load 140 independently through the AC bus 130, or connects an AC power grid 150 inline through a switch S.

All of the power storage devices above utilize the storage cells as storage elements. However, the characteristics of conventional storage cells are, for example, low power density, and long charging time, that is, slow response for dynamic load compensation. To be more precise, if the DC/AC converter is a three-phase converter, when the three-phase load is unbalanced, a ripple current with a low frequency of the DC bus which is coupled to the DC side of the DC/AC converter is large. Moreover, a ripple current with a low frequency is distributed between the storage cell and the capacitor of the DC bus and the amount of the distributed current is dependent upon the output impedance. A ripple current with a low frequency may not only increase the heat loss of the storage cell so that the life of the storage cell is affected, but also may result in a wide undulating voltage of the DC bus such that the quality of the current wave is affected and the stability of the power system is decreased. Furthermore, a deep discharge has a significant impact on the storage cell. Normally, the number of charge/discharge cycles of a storage cell seldom exceeds one thousand. Therefore, the maintenance cost of the power storage device with storage cells is increased.

For the foregoing reasons, there is a need for configuring a power storage module more efficiently so that the efficiency of the power storage device and the stability of the power system may be improved.

SUMMARY

To solve the issues above, this invention provides a power storage module including a power storage unit and a power management unit. The power storage unit includes a storage cell configured to provide a steady state power to the system. The power management unit includes a super capacitor configured to buffer the power of the system. When the three-phase load is unbalanced, the power management unit may restrain the undulating voltage of the AC power grid rapidly by the super capacitor. The super capacitor may absorb the ripple current with a low frequency generated by the DC side of the DC/AC converter effectively, such that the ripple current with a low frequency is prevented from increasing the heat loss of the storage cell. Accordingly, the quality of the output current wave is improved, the voltage stress is decreased and the stability of the power system is improved. Moreover, the efficiency of the power storage device with the power storage module above is improved and costs associated with disposing additional storage cells are avoided.

One aspect of the present disclosure is to provide a power storage module including a DC/AC converter, a first power storage element, a second power storage element and at least one DC/DC converter. The first power storage element is coupled to the DC side of the DC/AC converter to form a first power storage branch. The second power storage element is coupled to the DC side of the DC/AC converter to form a second power storage branch. The first power storage branch and the second power storage branch are connected in parallel. The DC/DC converter is disposed on the first power storage branch or the second power storage branch.

Another aspect of the present disclosure is to provide a power storage device including plurality of the power storage modules above-mentioned, wherein the AC sides of the DC/AC converters in the power storage modules are connected to each other in parallel.

Another aspect of the present disclosure is to provide a power storage module including a DC/AC converter, an AC load, a power storage unit and a power management unit. The AC load is coupled to the AC side of the DC/AC converter. The power storage unit and the power management unit are coupled to the DC side of the DC/AC converter. When the AC load is in a steady state, the power storage unit is configured to provide a steady state power to the AC load. When a change in the AC load occurs, the power management unit is configured to buffer the AC load through the DC/AC converter. The power storage unit and the power management unit are connected in parallel.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1A:
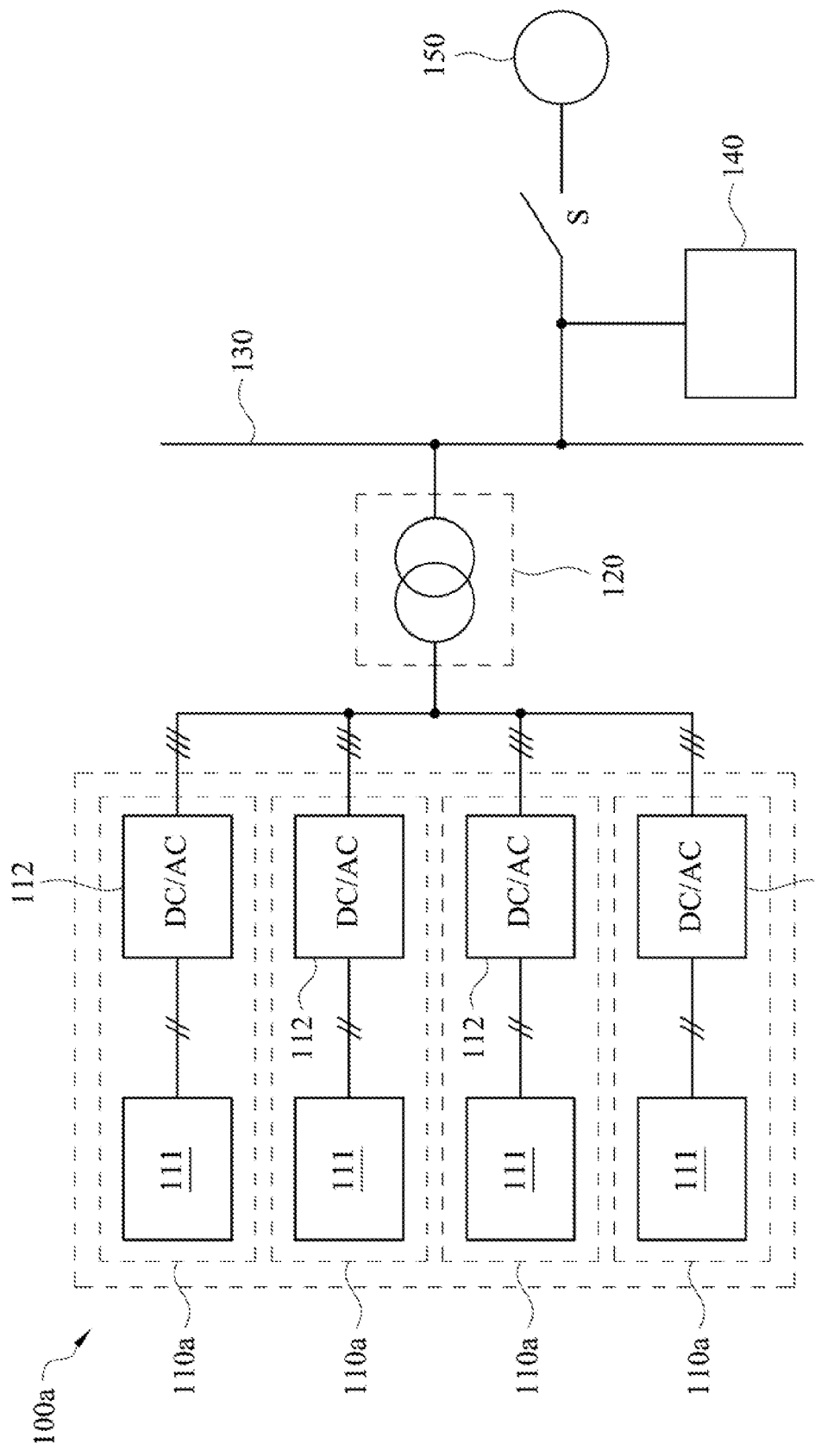
FIG. 1a illustrates a conventional single-stage isolation power storage device.
Figure 1B:
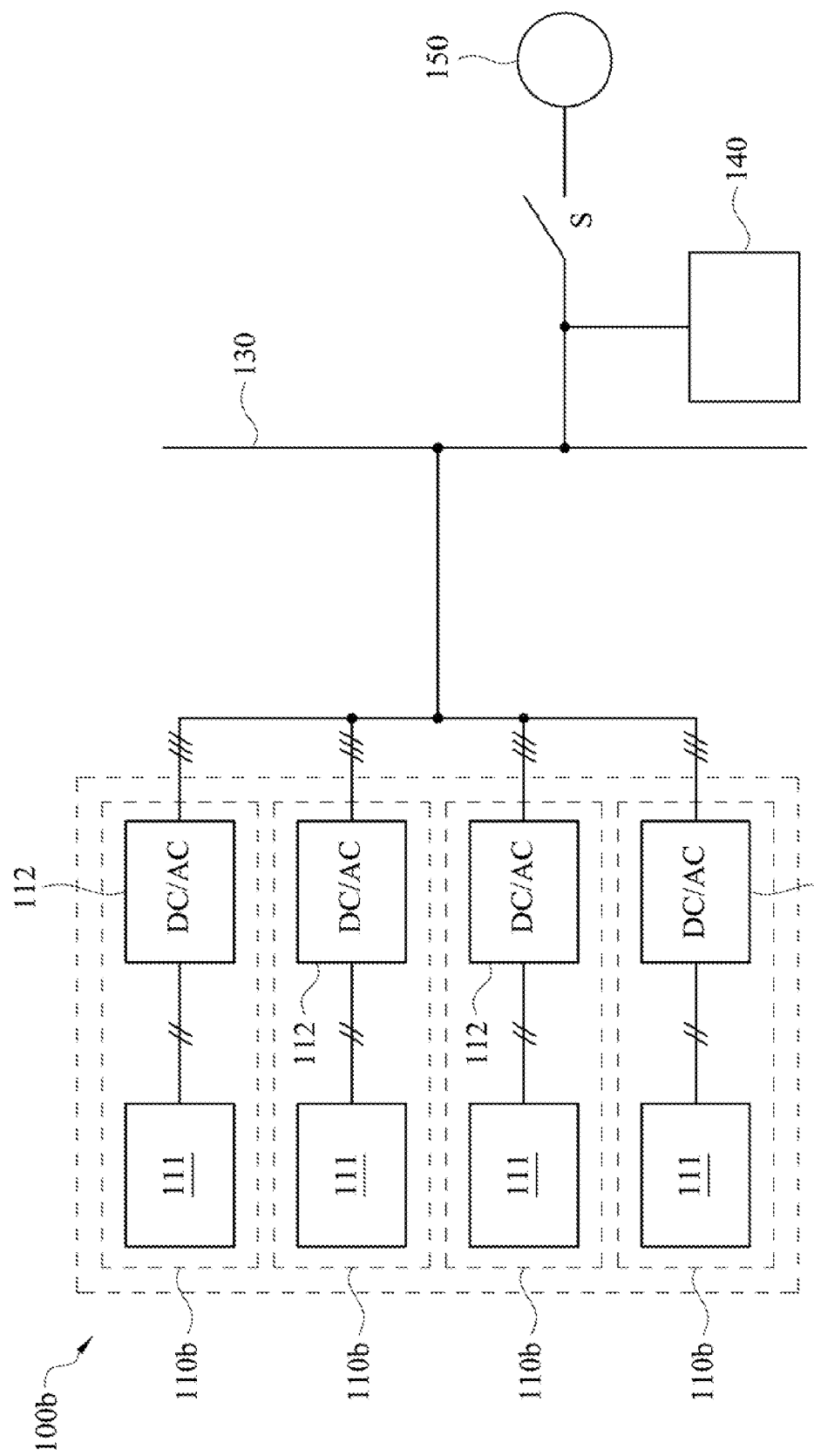
FIG. 1b illustrates a conventional single-stage non-isolation power storage device.
Figure 1C:
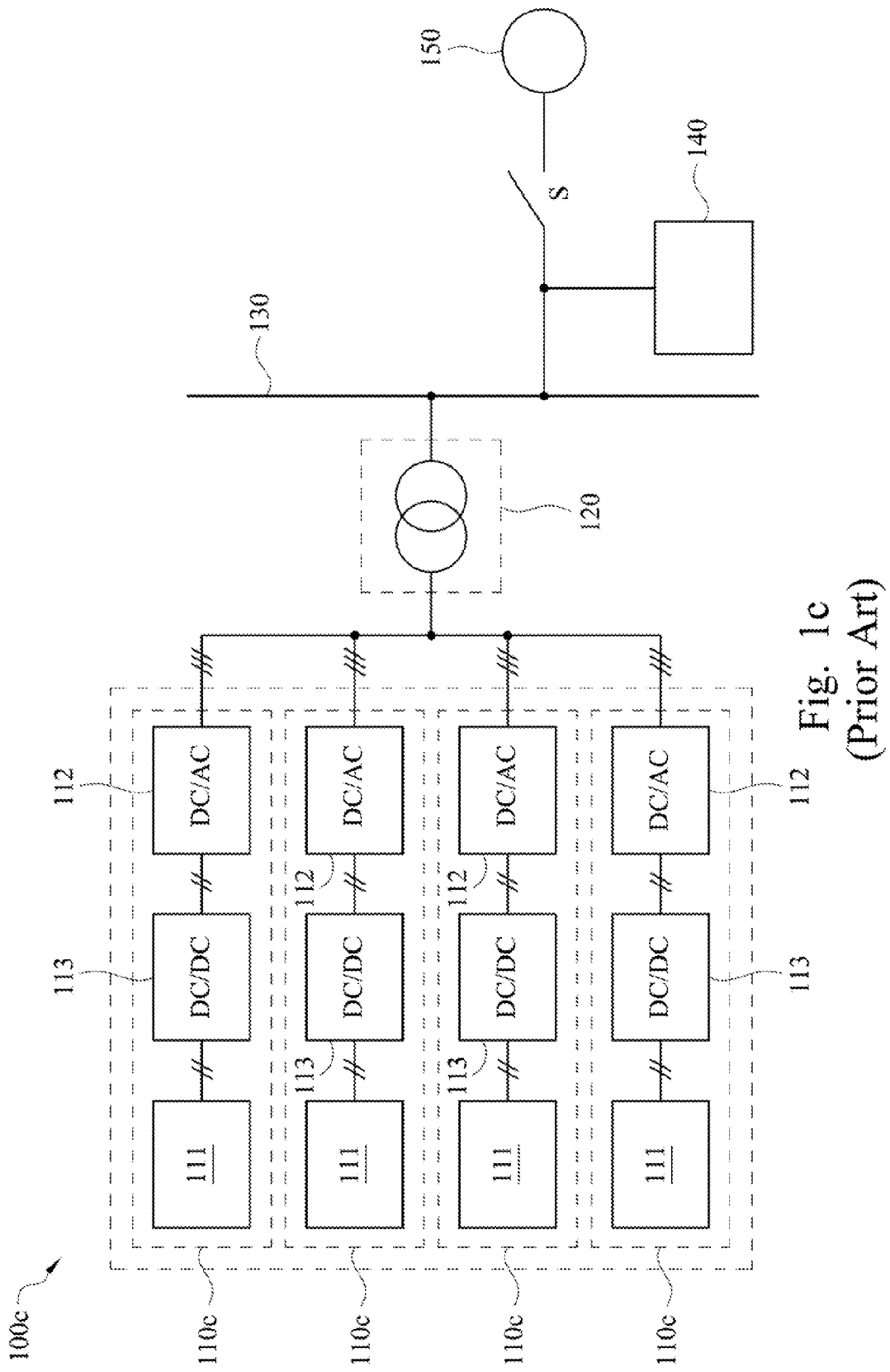
FIG. 1c illustrates a conventional double-stage isolation power storage device.
Figure 1D:
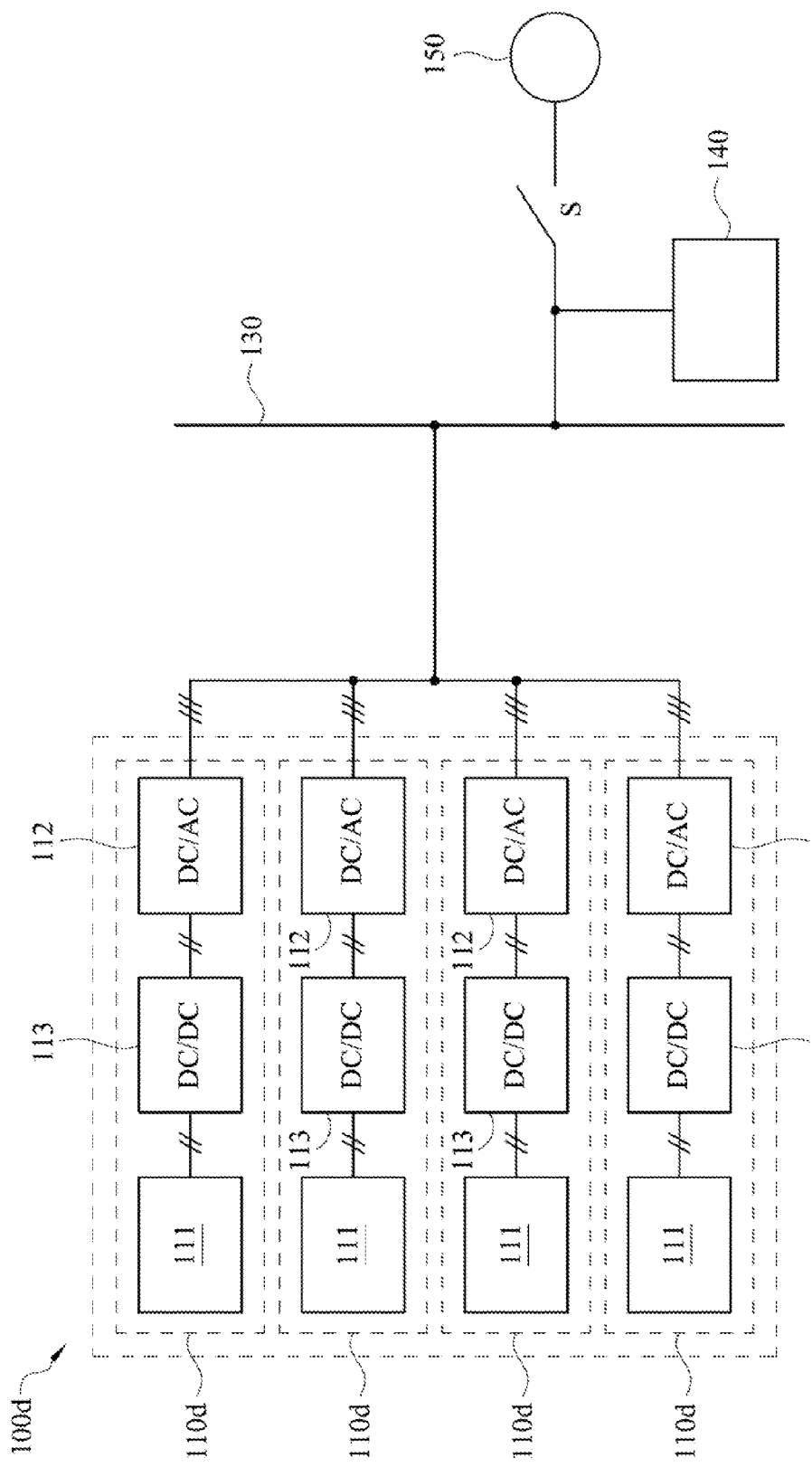
FIG. 1d illustrates a conventional double-stage non-isolation power storage device.
Figure 1E:
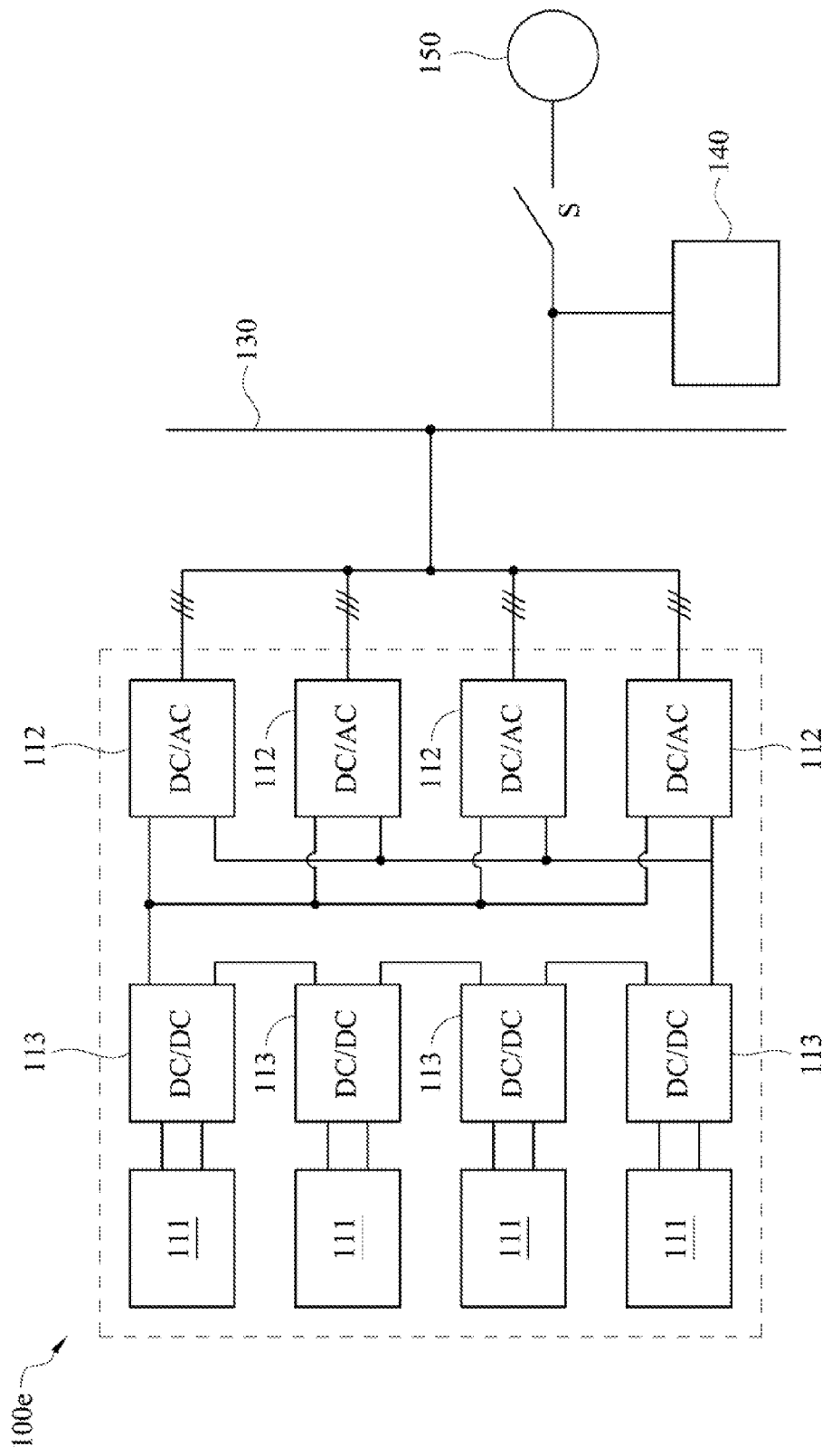
FIG. 1e illustrates a conventional double-stage serial power storage device.

Reference will now be made in detail to the present embodiments of the invention, examples of which are illustrated in the accompanying drawings. Wherever possible, the same reference numbers are used in the drawings and the description to refer to the same or like parts.

Figure 2:
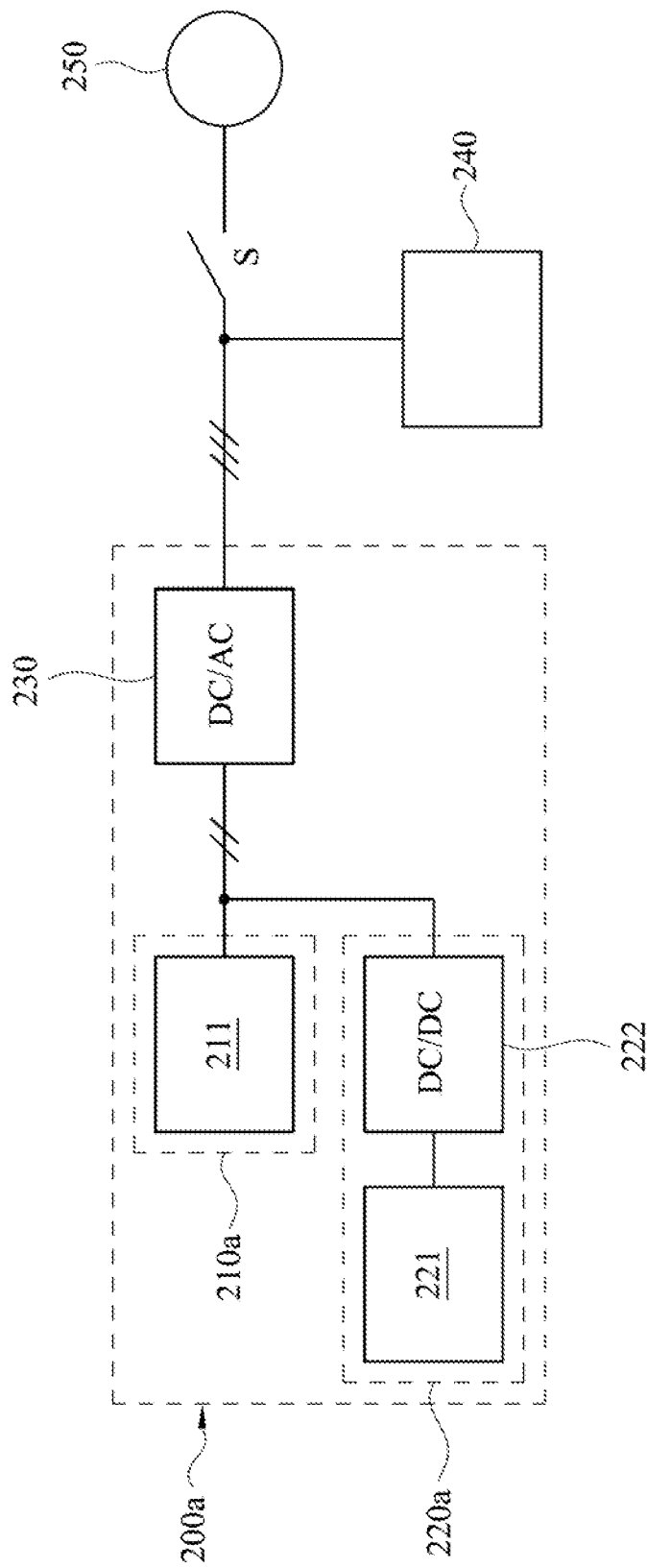
FIG. 2 is a schematic diagram illustrating a power storage module according to one embodiment of the present invention.

Reference is made to FIG. 2. FIG. 2 is a schematic diagram illustrating a power storage module according to one embodiment of the present invention. As shown in FIG. 2, the power storage module 200a includes a power storage unit 210a a power management unit 220a and a DC/AC converter 230. The power storage unit 210a and the power management unit 220a are both coupled to the DC side of the DC/AC converter 230. The power storage unit 210a and the power management unit 220a are connected in parallel.

The AC side of the DC/AC converter 230 is coupled to an AC load 240 and coupled to an AC power grid 250 through a switch S. By turning off or turning on the switch S, the DC/AC converter 230 connects the AC load 240 independently, or connects the AC load 240 and the AC power grid 250 in parallel. When the AC load 240 is in a steady state, the power storage unit 210a of the power storage module 200a provides a sufficient steady state power to the AC load 240 through the DC/AC converter 230. In other words, it provides a steady power to the user side. When a change in the AC load occurs (that is, a discontinuous load condition is encountered, in which discontinuous load refers to a step change), the power management unit 220a of the power storage module 200a may buffer the AC load 240 through the DC/AC converter 230. In other words, voltage fluctuations and frequency shifting resulting from a discontinuous AC load 240 may be restrained.

In this embodiment, the power storage unit 210a may include a first power storage element 211, and the power management unit 220a may include a second power storage element 221 and a DC/DC converter 222. The second power storage element 221 is connected to the power storage unit 210a in parallel through the DC/DC converter 222, that is, connected to the first power storage element 211 in parallel.

Further, the first power storage element 211 in the power storage unit 210a which provides a steady state power is different from the second power storage element 221 in the power management unit 220a which buffers power. The power storage unit 210a is utilized to provide power continuously, so the capacity of the first power storage element 211 needs to be large. The power management unit 220a is utilized to buffer power rapidly, so the charging/discharging speed of the second power storage element 221 needs to be fast. Accordingly, the capacity of the first power storage element 211 is typically larger than that of the second power storage element 221.

In the present embodiment, the first power storage element 211 may be a storage cell, for example, a lead-acid cell, a nickel-cadmium cell, a nickel metal hydride battery, a sodium-sulfur cell, a lithium cell or a fuel cell. The kind of the storage cell is not limited to those mentioned in the present embodiment. Further, the second power storage element 221 may be a super capacitor. Compared to a storage cell, a super capacitor possesses the characteristics of high power density, high charging/discharging speed, low energy density, and a high number of charge/discharge cycles (possibly more than ten thousand). Because of the high charging/discharging speed of a super capacitor, when a change in the AC load 240 occurs, voltage fluctuations due to the AC load 240 may be restrained by the super capacitor rapidly, and the power may be buffered too. When the AC load 240 is in a steady state, a storage cell with a high energy density may provide steady power to the AC load 240. Therefore, the efficiency of the power storage module is optimized.

Moreover, the first power storage element 211 (e.g., storage cell) of the power storage unit 210a is coupled to the DC side of the DC/AC converter 230 to form a first power storage branch. The second power storage element 221 (e.g., super capacitor) of the power management unit 220a is coupled to the DC side of the DC/AC converter 230 to form a second power storage branch through the DC/DC converter 222. Each of the first power storage branch and the second power storage branch is a single circuit. Accordingly, control of the storage cell and the super capacitor is easy, and problems associated with balancing of the lifespan of the storage cells are not encountered.

In the present embodiment, the second power storage element 221 (e.g., super capacitor) of the power management unit 220a is connected to the first power storage element 221 (e.g., storage cell) in parallel. That is, the DC/DC converter 222 is disposed on the second power storage branch. Because the voltage of a single super capacitor is from about 2V to about 3V and the DC side voltage of the DC/AC converter 230 is higher than this level, the voltage of the super capacitor may be boosted through the DC/DC converter 222 in order to make the power management unit 220a provide sufficient voltage to the DC side of the DC/AC converter 230. Accordingly, the required number of the super capacitors in series is reduced. When the load power changes, the power management unit 220a may provide buffering energy rapidly so that the load impact is restrained because the super capacitor is discharged fast.

Further, if the DC/AC converter 230 is a three-phase converter, that is, the power storage module 200a is installed in a three-phase power system and the AC load 240 is a three-phase load, when the AC load 240 is unbalanced, a higher ripple current with a low frequency may be generated on the DC side of the DC/AC converter 230. The ripple current with a low frequency may be absorbed efficiently by the second power storage element 221 (e.g., super capacitor) of the power management unit 220a. Moreover, the output impedance of the super capacitor on the second power storage branch may be reduced through the DC/DC converter 222, such that the effect from the larger equivalent series resistance (ESR) of the super capacitor may be avoided. As a result, not only is an increase in heat loss of the power cell due to a ripple current with a low frequency prevented, but a reduction in the lifespan of the power cell is also prevented. Thus, the stability of the power system may be improved. In some embodiments, the DC side of the DC/AC converter 230 in the power storage module 200a may be coupled to a DC load so that the power storage module 200a may provide power to the DC load independently. In some embodiments, the DC side of the DC/AC converter 230 in the power storage module 200a may be coupled to at least one power input module. In other words, the first power storage element 211 (e.g., storage cell) and the second power storage element 221 (e.g., super capacitor) of the power storage module 200a may be energized by the power input module. The power input module may be a renewable energy generating apparatus, for example, a solar energy generating apparatus, a wind power generating apparatus, a tidal power generating apparatus, and so on.

Figure 3:
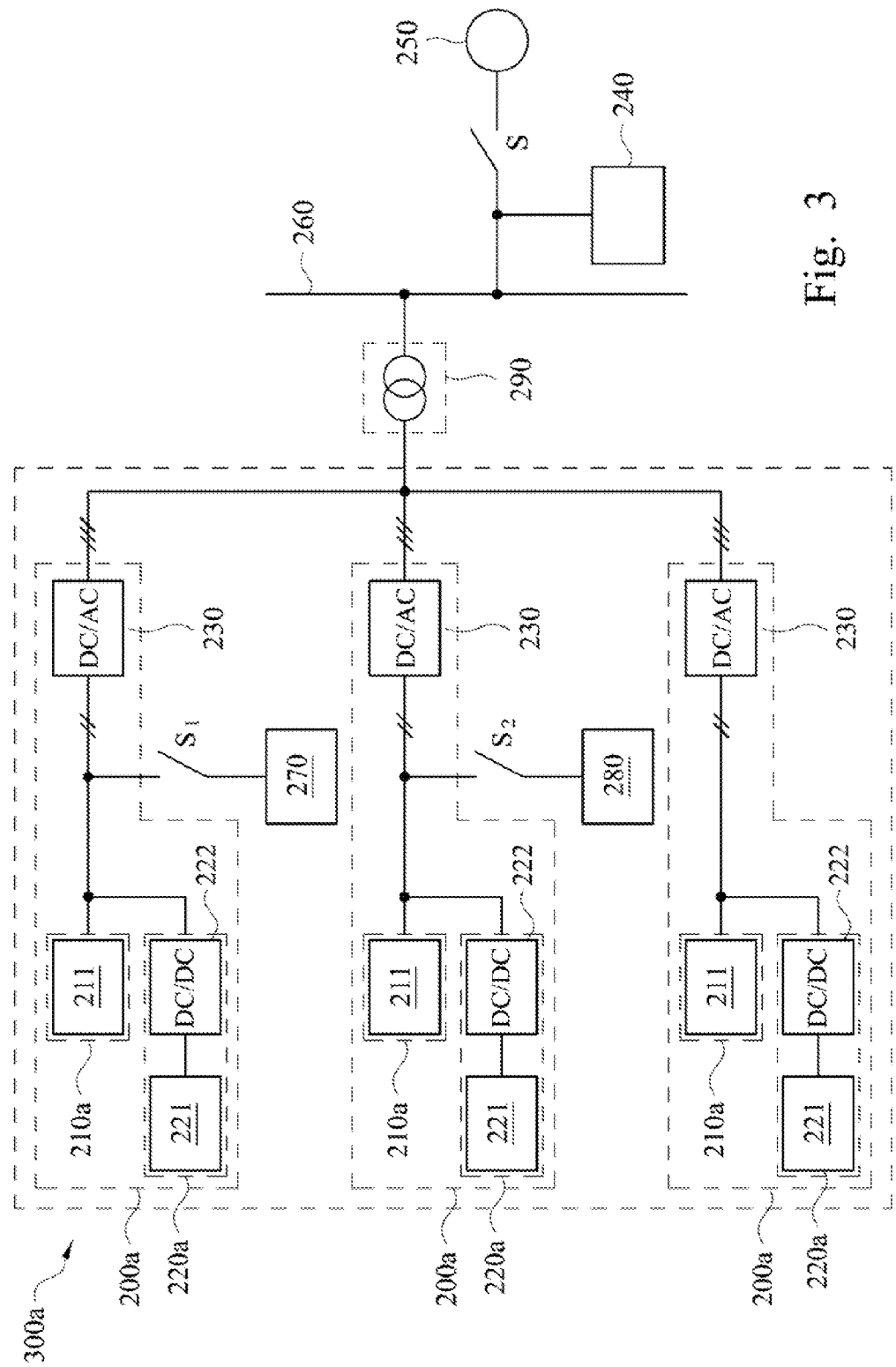
FIG. 3 is a schematic diagram illustrating a power storage device according to one embodiment of the present invention.

Reference is made to FIG. 3. FIG. 3 is a schematic diagram illustrating a power storage device according to one embodiment of the present invention. As shown in FIG. 3, the power storage device 300a includes a plurality of the power storage modules 200a of FIG. 2. The AC side of the DC/AC converter 230 in each power storage module 200a is connected to each other in parallel. In the present embodiment, the quantity of the power storage modules 200a is three, but the present embodiment is not limited to any quantity. In practice, the power storage device 300a may be an isolation type or a non-isolation type power storage device. That is, the power storage device 300a may be coupled to an AC bus 260 directly or through a transformer 290. In the present embodiment, the power storage device 300a is an isolation type power storage device, but the present embodiment is not limited to any type of power storage device. The DC/AC converter 230 of at least one power storage module 200a may be a three-phase converter in the power storage device 300a. In the power storage device 300a, the AC side of each DC/AC converter 230 is coupled to one side of the transformer 290. The other side of transformer 290 is coupled to the AC bus 260. The power storage device 300a collects the power to the AC bus 260 through the transformer 290. The power storage device 300a connects an AC load 240 independently by the AC bus 260 or connects an AC power grid 250 inline by a switch S.

Moreover, in the power storage device 300a, the DC side of the DC/AC converter 230 of at least one power storage module 200a is coupled to a DC load 270 through a switch S1 so that the power storage module 200a may provide power to the DC load 270 independently. Furthermore, in the power storage device 300a, the DC side of the DC/AC converter 230 of at least one power storage module 200a is coupled to at least one power input module 280 through a switch S2. In other words, the first power storage element 211 (e.g., storage cell) and the second power storage element 221 (e.g., super capacitor) of the power storage module 200a may be energized by the power input module 280. The power input module 280 may be a renewable energy generating apparatus, for example, a solar power generating apparatus, a wind power generating apparatus, a tidal power generating apparatus, and so on. Because a super capacitor may restrain voltage fluctuations rapidly, a power buffering effect may be achieved. Therefore, by installing the power storage module 200a between the power input module 280 and the AC power grid 250, the utilization efficiency of renewable energy may be improved.

Accordingly, a greater power demand of the power system may be realized by a power storage device with multiple power storage modules. Because each power storage branch is a single circuit in the power storage module, any quantity of the power storage modules can be added easily and flexibly. Moreover, in every power storage module, a DC load or a power input module is configured on the DC side of the DC/AC converter, such that the utilization efficiency of the power storage device is improved.

Figure 4:
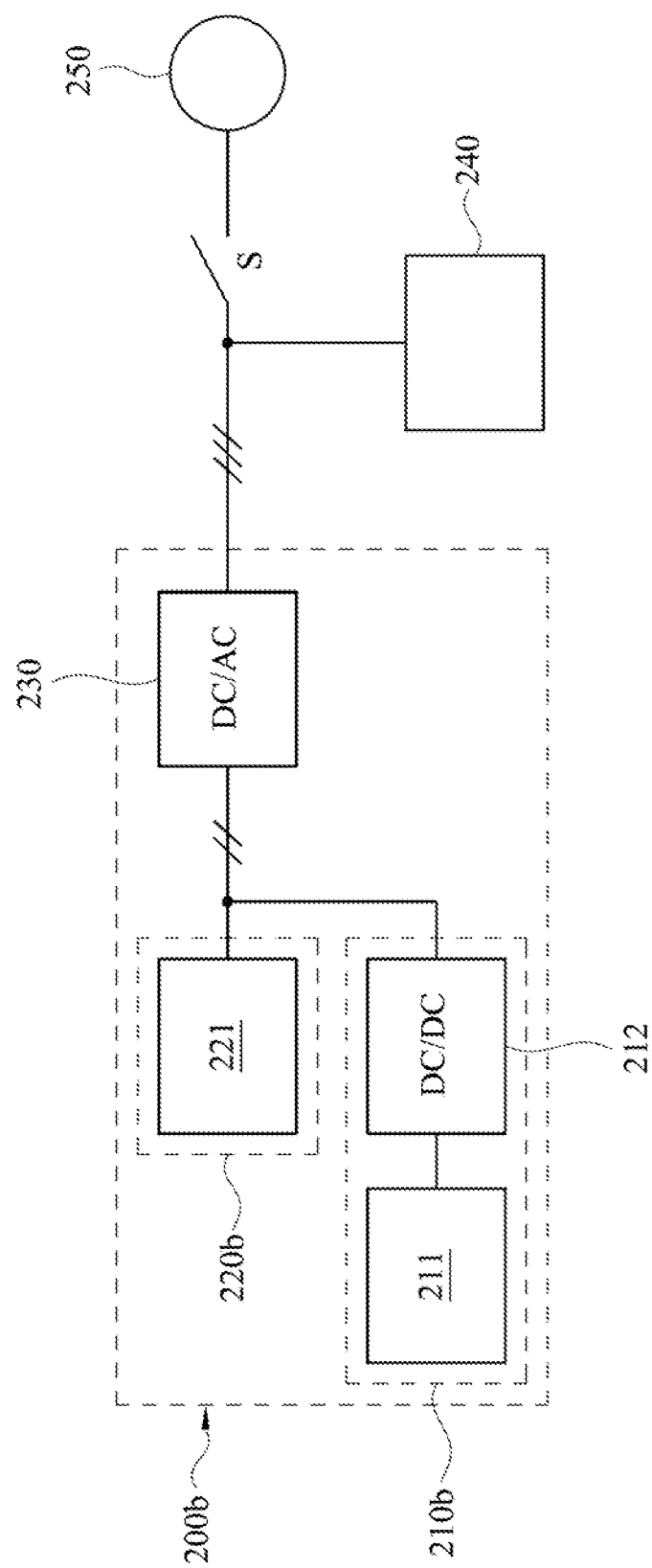
FIG. 4 is a schematic diagram illustrating a power storage module according to another embodiment of the present invention.

Reference is made to FIG. 4. FIG. 4 is a schematic diagram illustrating a power storage module according to another embodiment of the present invention. Similarly, the power storage module 200b includes a power storage unit 210b, a power management unit 220h and a DC/AC converter 230. The power storage unit 210b and the power management unit 220b are both coupled to the DC side of a DC/AC converter 230. The power storage unit 210b may include a first power storage element 211 and a DC/DC converter 212, and the power management unit 220b may include a second power storage element 221. The first power storage element 211 is connected to the power management unit 220b in parallel through the DC/DC converter 212, that is, connected to the second power storage element 221 in parallel. The first power storage element 211 may be a storage cell, for example, a lead-acid cell, a nickel-cadmium cell, a nickel metal hydride battery, a sodium-sulfur cell, a lithium cell or a fuel cell. The kind of the storage cell is not limited to those mentioned in the present embodiment. Further, the second power storage element 221 may be a super capacitor. The capacity of the first power storage element 211 is larger than that of the second power storage element 221.

Similarly, the first power storage element 211 (e.g., storage cell) of the power storage unit 210b is coupled to the DC side of the DC/AC converter 230 to form a first power storage branch through the DC/DC converter 212. That is, the DC/DC converter 212 is disposed on the first power storage branch. The second power storage element 221 (e.g., super capacitor) of the power management unit 220b is coupled to the DC side of the DC/AC converter 230 to form a second power storage branch. Each of the first power storage branch and the second power storage branch is a single circuit. It should be noted that if the DC/AC converter 230 is a three-phase converter, and the AC load 240 is a three-phase load, when the AC load 240 is unbalanced, a higher ripple current with a low frequency may be generated on the DC side of the DC/AC converter 230. The first power storage element 211 (e.g., storage cell) of the power storage unit 210b may increase the impedance of the first power storage branch through the DC/DC converter 212 so that the ripple current with a low frequency may be mainly absorbed by the second power storage element 221 (e.g., super capacitor) of the second power storage branch. The connection and operation of the power storage module 200b are the same as those of the power storage module 200a, and so a description in this regard is not repeated herein.

Figure 5:
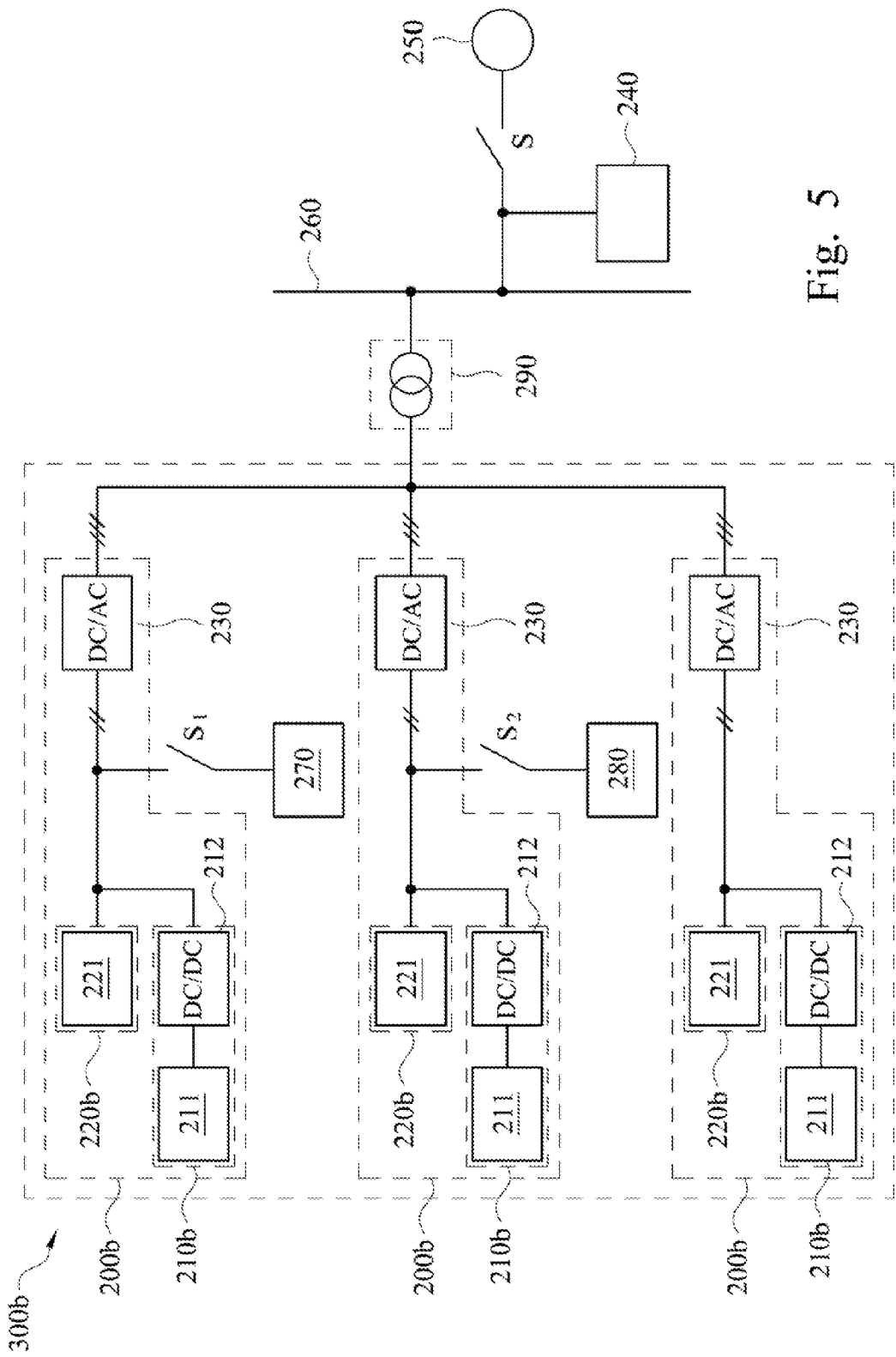
FIG. 5 is a schematic diagram illustrating a power storage device according to another embodiment of the present invention.

Reference is made to FIG. 5. FIG. 5 is a schematic diagram illustrating a power storage device according to another embodiment of the present invention. Similarly, the power storage device 300b includes a plurality of the power storage modules 200b of FIG. 4. The connection and the operation of the power storage modules 200b are described in relation to FIG. 4, and are not repeated herein. Moreover, comparing FIG. 5 with FIG. 3, the major difference therebetween is that, in FIG. 5, the power storage unit 210b of each of the power storage modules 200b includes the first power storage element 211 and the DC/DC converter 212 connected in series, while in FIG. 3, the power storage unit 210a of each of the power storage modules 200a only includes the second power storage element 221. Further, in FIG. 5, the power management unit 220b of each of the power storage modules 200b merely includes the second power storage element 221, while in FIG. 3, the power management unit 220a of each of the power storage modules 200a includes the second power storage element 221 and the DC/DC converter 222 connected in series. In other words, in FIG. 3, the DC/AC converter of the power storage module 200a is configured on the second power storage branch, while in FIG. 5, the DC/AC converter 230 of each of the power storage modules 200b is configured on the first power storage branch. It should be noted that the power storage device 300b may be an isolation type or a non-isolation type power storage device. In the present embodiment, the power storage device 300b is an isolation type power storage device, but the present embodiment is not limited to any type of the power storage device.

Figure 6:
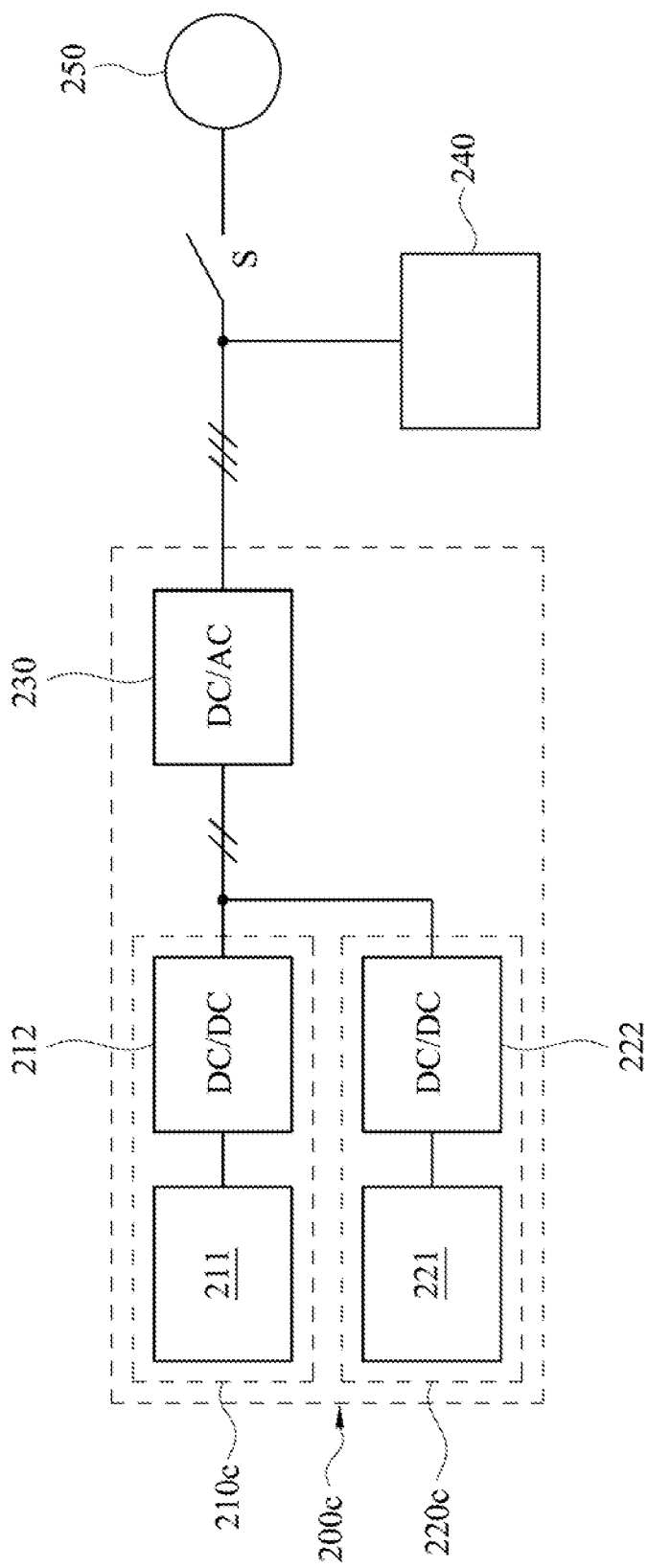
FIG. 6 is a schematic diagram illustrating a power storage module according to another embodiment of the present invention.

Reference is made to FIG. 6. FIG. 6 is a schematic diagram illustrating a power storage module according to another embodiment of the present invention. Similarly, the power storage module 200c includes a power storage unit 210e, a power management unit 220c and a DC/AC converter 230. The power storage unit 210c and the power management unit 220c are both coupled to the DC side of the DC/AC converter 230. The power storage unit 210c and the power management unit 220c are connected in parallel. The power storage unit 210c may include a first power storage element 211 and a DC/DC converter 212, and the power management unit 220c may include a second power storage element 221 and a DC/DC converter 222. The first power storage element 211 is coupled to the DC side of the DC/AC converter 230 through the DC/DC converter 212. The second power storage element 221 coupled to the DC side of the DC/AC converter 230 through the DC/DC converter 222.

Similarly, the first power storage element 211 may be a storage cell, for example, a lead-acid cell, a nickel-cadmium cell, a nickel metal hydride battery, a sodium-sulfur cell, a lithium cell or a fuel cell. The kind of the storage cell is not limited to those mentioned in the present embodiment. Further, the second power storage element 221 may be a super capacitor. The capacity of the first power storage element 211 is larger than that of the second power storage element 221.

Similarly, the first power storage element 211 (e.g., storage cell) of the power storage unit 210c is coupled to the DC side of the DC/AC converter 230 to form a first power storage branch through the DC/DC converter 212. That is, the DC/DC converter 212 is disposed on the first power storage branch. Moreover, the second power storage element 221 (e.g., super capacitor) of the power management unit 220c is coupled to the DC side of the DC/AC converter 230 to form a second power storage branch through the DC/DC converter 222. That is, the DC/DC converter 222 is disposed on the second power storage branch. Each of the first power storage branch and the second power storage branch is a single circuit respectively.

In the present embodiment, the power storage module 200c combines the advantages of the power storage module 200a in FIG. 3 and the power storage module 200b in FIG. 5. Accordingly, if the DC/AC converter 230 is a three-phase converter, and the AC load 240 is a three-phase load, when the AC load 240 is unbalanced, a higher ripple current with a low frequency may be generated on the DC side of the DC/AC converter 230. The first power storage element 211 (e.g., storage cell) of the power storage unit 210b may increase the impedance of the first power storage branch through the DC/DC converter 212 so that the ripple current with a low frequency may be mainly absorbed by the second power storage element 221 (e.g., super capacitor) of the second power storage branch. Moreover, the second power storage element 221 (e.g., super capacitor) of the power management unit 220c may decrease the output impedance of the second power storage branch through the DC/DC converter 222. The effect from the larger equivalent series resistance (ESR) of the super capacitor may be avoided. The super capacitor may absorb the ripple current with a low frequency and the voltage thereof may be boosted through the DC/DC converter 222 so that the required quantity of the super capacitors in series reduced. Accordingly, not only is an increase in heat loss owing of the storage cell due to a ripple current with a low frequency prevented, but a reduction in the life span of the storage cell is also prevented. Hence, the stability of the power system is improved.

Figure 7:
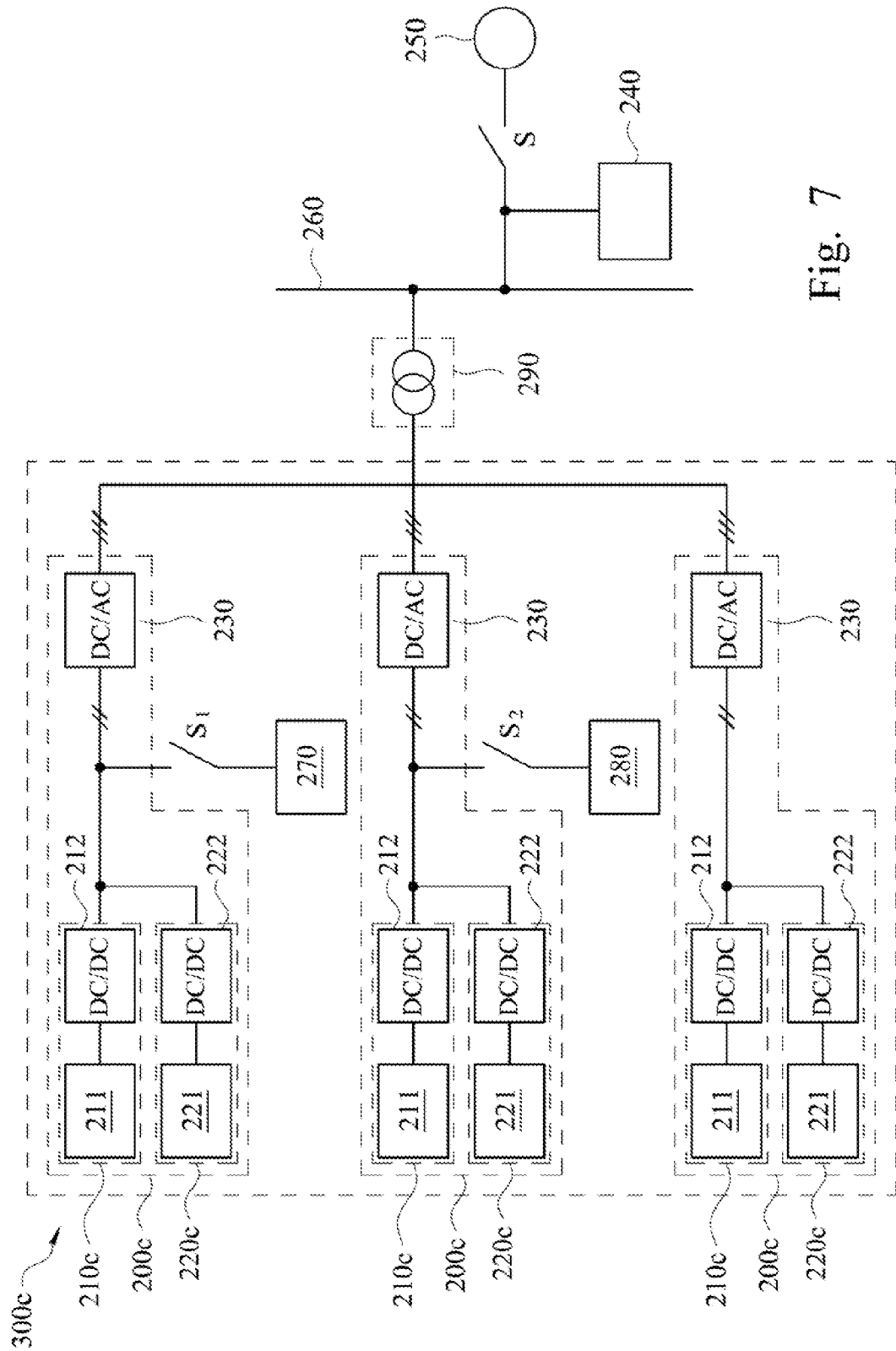
FIG. 7 is a schematic diagram illustrating a power storage device according to another embodiment of the present invention.

Reference is made to FIG. 7. FIG. 7 is a schematic diagram illustrating a power storage device according to another embodiment of the present invention. Similarly, the power storage device 300c includes a plurality of the power storage modules 200c of FIG. 6. The connection and operation of the power storage module 200c are described in related description for FIG. 6, and are not repeated herein. It should be noted that the power storage device 300c may be an isolation type or a non-isolation type power storage device. In the present embodiment, the power storage device 300c is an isolation type power storage device, but the present embodiment is not limited to any type of power storage device.

Accordingly, a greater power demand of the power system may be realized by the power storage device with multiple power storage modules. Because each power storage branch is a single circuit in the power storage module, any quantity of the power storage modules can be added easily and flexibly. Moreover, in every power storage module, a DC load or a power input module is configured on the DC side of the DC/AC converter, such that the utilization efficiency of the power storage device is improved.

According to the embodiments of the present invention above, the power storage unit and the power management unit are configured in the power storage module. The power storage unit includes a storage cell providing a steady state power to the system. The power management unit includes a super capacitor buffering the power of the system. When the three-phase load is unbalanced, the power management unit may restrain the undulating voltage of the AC power grid rapidly by the super capacitor. The super capacitor may absorb the ripple current with a low frequency generated by the DC side of the DC/AC converter effectively, prevent the ripple current with a low frequency from increasing the heat loss of the storage cell, improve the quality of the output current wave, decrease the voltage stress of the power device, and improve the stability of the power system. Moreover, the super capacitor may be charge/discharged more than ten thousand times so that the cycle life of the storage cell is increased. The utilization efficiency of the power storage device and the power storage module is improved, and costs associated with having to dispose additional storage cells are avoided.

Although the present invention has been described in considerable detail with reference to certain embodiments thereof, other embodiments are possible. Therefore, the spirit and scope of the appended claims should not be limited to the description of the embodiments contained herein.

It will be apparent to those sidled in the art that various modifications and variations can be made to the structure of the present invention without departing from the scope or spirit of the invention. In view of the foregoing, it is intended that the present invention cover modifications and variations of the present invention provided they fall within the scope of the following claims and their equivalents.

What is claimed is:

1. A power storage module, comprising:
a DC/AC converter,
a first power storage element;
a second power storage element; and
at least one DC/DC converter,
wherein the first power storage element and the second power storage element are coupled to the DC side of the DC/AC converter to form a first power storage branch and a second power storage branch respectively, wherein the first power storage branch and the second power storage branch are connected in parallel, and wherein the at least one DC/DC converter is disposed on the first power storage branch to increase an output impedance of the first power storage branch or disposed on the second power storage branch to decrease an output impedance of the second power storage branch,
wherein a capacity of the first power storage element is greater than a capacity of the second power storage element, the first power storage element is a storage cell, and the second power storage element is a super capacitor.

2. The power storage module of claim 1, wherein the storage cell includes a lead-acid cell, a nickel-cadmium cell, a nickel metal hydride battery, a sodium-sulfur cell, a lithium cell or a fuel cell.

3. The power storage module of claim 1, wherein the at least one DC/DC converter is disposed on the first power storage branch and the first power storage element is coupled to the DC side of the DC/AC converter through the at least one DC/DC converter.

4. The power storage module of claim 1, wherein the at least one DC/DC converter is disposed on the second power storage branch and the second power storage element is coupled to the DC side of the DC/AC converter through the at least one DC/DC converter.

5. The power storage module of claim 1, wherein the at least one DC/DC converter include a first DC/DC converter and a second DC/DC converter, wherein the first DC/DC converter and the second DC/DC converter are disposed on the first power storage branch and the second power storage branch respectively, wherein the first power storage element is coupled to the DC side of the DC/AC converter through the first DC/DC converter and wherein the second power storage element is coupled to the DC side of the DC/AC converter through the second DC/DC converter.

6. The power storage module of claim 1, wherein the DC/AC converter is a three-phase converter.

7. The power storage module of claim 1, wherein the AC side of the DC/AC converter is coupled to an AC power grid.

8. The power storage module of claim 1, wherein the AC side of the DC/AC converter is coupled to an AC load.

9. The power storage module of claim 1, wherein the DC side of the DC/AC converter is coupled to a DC load.

10. The power storage module of claim 1, wherein the DC side of the DC/AC converter is coupled to at least one power input module.

11. A power storage device, comprising a plurality of the power storage modules of claim 1, wherein the AC sides of the DC/AC converters in the power storage modules are connected to each other in parallel.

12. The power storage device of claim 11, wherein the DC/AC converter in at least one of the power storage modules is a three-phase converter.

13. The power storage device of claim 11, wherein the DC side of the DC/AC converter in at least one of the power storage modules is coupled to a DC load.

14. The power storage device of claim 11, wherein the DC side of the DC/AC converter in at least one of the power storage modules is coupled to at least one power input module.

15. The power storage device of claim 14, wherein the at least one power input module includes a solar energy generation input module, a wind power generation input module, or a tidal power generation input module.

16. The power storage device of claim 11, wherein the AC side of the DC/AC converter in each of the power storage modules is coupled to an AC bus through a transformer.

17. The power storage device of claim 16, wherein the AC bus is electrically coupled to an AC power grid or an AC load.

18. The power storage device of claim 11, wherein the AC side of the DC/AC converter in each of the power storage modules is electrically coupled to an AC bus directly.

19. The power storage device of claim 18, wherein the AC bus is electrically coupled to an AC power grid or an AC load.

20. A power storage module, comprising:
a DC/AC converter;
an AC load coupled to the AC side of the DC/AC converter;
a power storage unit coupled to the DC side of the DC/AC converter, wherein when the AC load is in a steady state, the power storage unit is configured to provide a steady state power to the AC load; and
a power management unit coupled to the DC side of the DC/AC converter, wherein when a change in the AC load occurs, the power management unit is configured to buffer the AC load through the DC/AC converter;
wherein the power storage unit and the power management unit are connected in parallel,
wherein the power storage unit includes a first power storage element, the power management unit includes a second power storage element, and a capacity of the first power storage element is larger than a capacity of the second power storage element,
wherein
the power storage unit further includes a first DC/DC converter, the first power storage element is coupled to the DC side of the DC/AC converter through the first DC/DC converter to form a first power storage branch, and the first DC/DC converter is configured to increase an output impedance of the first power storage branch; or
the power management unit includes a second DC/DC converter, the second power storage element is coupled to the DC side of the DC/AC converter through the second DC/DC converter to form a second power storage branch, and the second DC/DC converter is configured to decrease an output impedance of the second power storage branch.

21. The power storage module of claim 20, wherein the power storage unit further includes the first DC/DC converter, and the power management unit further includes the second DC/DC converter, wherein the first power storage element is coupled to the DC side of the DC/AC converter through the first DC/DC converter to form the first power storage branch, and wherein the second power storage element is coupled to the DC side of the DC/AC converter through the second DC/DC converter to form the second power storage branch.

22. The power storage module of claim 21, wherein the first DC/DC converter is configured to increase the output impedance of the first power storage branch and the second DC/DC converter is configured to decrease the output impedance of the second power storage branch.

23. The power storage module of claim 20, wherein the AC load is an AC power grid.

24. The power storage module of claim 20, wherein the DC/AC converter is a three-phase converter and the AC load is a three-phase load, and wherein when the AC load is unbalanced, the power management unit absorbs the ripple current with a low frequency from the DC side of the DC/AC converter.

* * * * *